May 14, 1946.  A. MURRAY  2,400,365
AIRSPACED PHOTOGRAPHIC SUPPORT
Filed Jan. 6, 1945
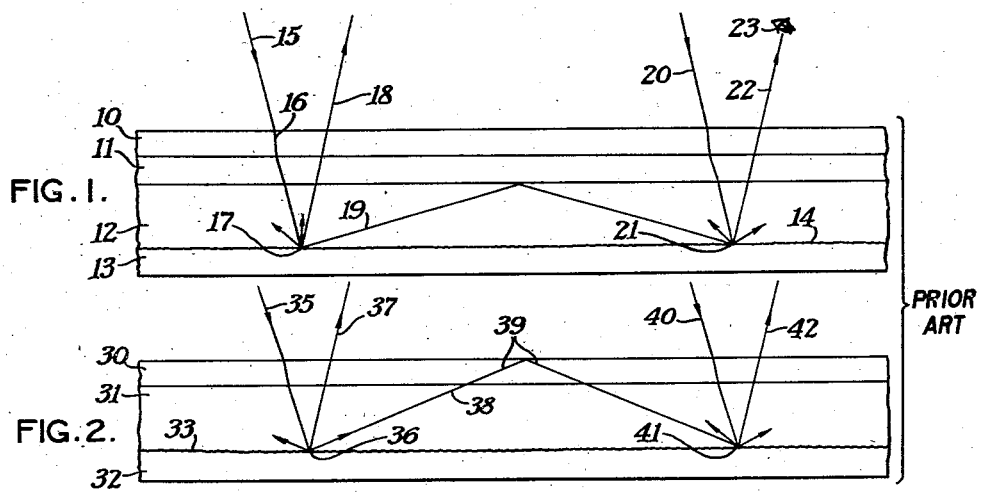
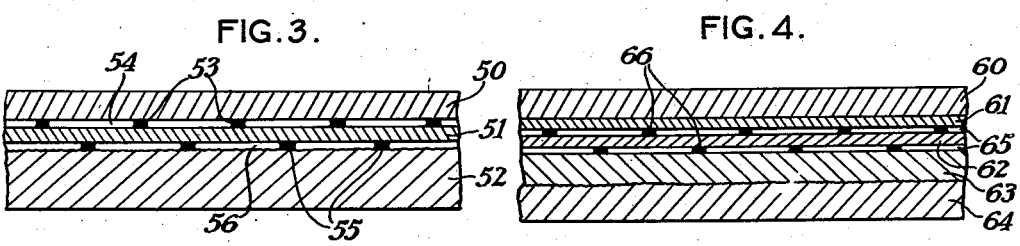
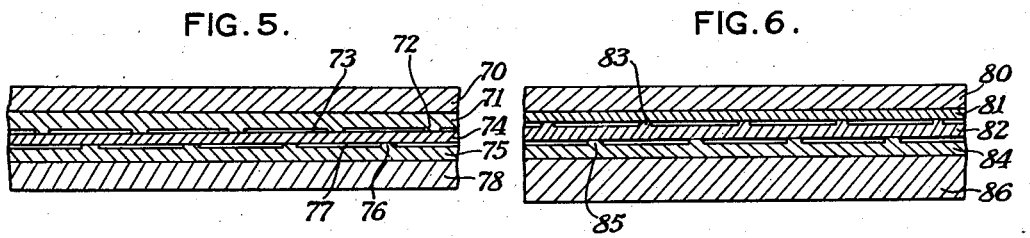
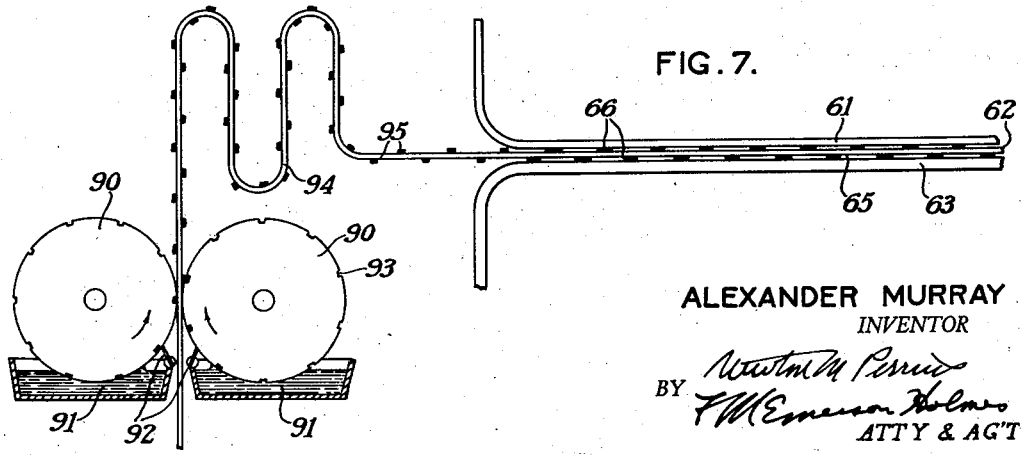
ALEXANDER MURRAY
INVENTOR Patented May 14, 1946

2,400,365

UNITED STATES PATENT OFFICE 2,400,365

AIRSPACED PHOTOGRAPHIC SUPPORT

Alexander Murray, Rochester, N. Y., assignor to Eastman Kodak Company, Rochester, N. Y., a corporation of New Jersey Application January 6, 1945, Serial No. 571,661

10 Claims. (Cl. 95—8)

This is a continuation in part of Serial Number 493,368, filed July 3, 1943.

This invention relates to photographic supports particularly to those to be used in color photography when making color prints.

It relates particularly to the airspaces supports described by Hanson and Evans in copending application, Serial No. 576,230, filed February 5, 1945.

The purpose of this continuation-in-part application is to include certain limitations as to the thickness of the airspace which are inherent in the invention and which distinguish over prior arrangements which actually have nothing to do with the present invention. For example U. S. Patent 315,703, Bencke et al., shows a picture layer airspaced from a diffusing layer in order to get a softened appearance due to halation which is exactly opposite to the purpose and effect of the present invention. In the Bencke arrangement, the separation of the picture layer and the diffusing layer is very large, many times the total thickness of ordinary photographic papers so that the scattered light reduces the detail contrast, the sharpness, and the color saturation of the picture giving a softened or "porcelain" appearance. Even in ordinary photographic prints in which the diffusing layer is attached to the picture layer, this effect is not present. For convenience the scattering of light in the Bencke et al. arrangement may be referred to as "primary halation" in which case it should be noted that the effect of "primary halation" in ordinary photographic prints is negligible since the spreading of light thereby is less than the minimum detail of the picture anyway.

However, in ordinary color prints, there is what may be termed "secondary halation" due to multiple internal reflections within the picture layer. This secondary or residual halation is removed by the present invention. The present invention would have no value in any arrangement having an objectionable degree of primary halation. If the separation of the picture and diffusing layers were made greater than 5/1000 of an inch, primary halation due to the Bencke effect would counteract the function of the present invention rendering it inoperative. Preferably this separation should be less than 1/1000 of an inch. Since the airspace must be equal to or less than this separation, these values also constitute the upper limits of the airspace thickness.

The airspace according to the present invention can have any thickness less than that just specified but of course there must be some airspace. Optical contact or even thicknesses less than one or two wave lengths of light introducing interference patterns would not allow the invention to operate properly, but mechanical contact at scattered points, as with a rough or textured surface would still permit the operation of the present invention quite satisfactorily. The intermediate areas of course are separated more than one or two wave lengths of light. Therefore the present invention requires the airspace (or other low index medium) to have a thickness greater than .00005 inch and since the separation of the picture and diffusing layers is equal to or greater than the airspace, this is the lower limit of the separation. Thus both the airspace and the separation of the picture and diffusing layers must be between .00005 inch and .005 inch preferably less than .001 inch.

Specifically the present invention relates to an improved support and method of producing such a support relative to that described in my copending application, Serial No. 571,662, filed concurrently herewith. The present invention involves a slightly more complicated structure since two or more airspace layers are provided, but it has the advantage over my copending case that the airspace is effective over 100% of the picture area.

According to the invention, this additional advantage of 100% effectiveness is gained in the case of a photographic color print by having, between the image bearing layer and the light diffusing support, a thin transparent pellicle on either side of which is an airspace, the contact between the pellicle and the image bearing layer being provided by one set of contact areas preferably of small diameter and covering less than ½ the total area and the contact between the pellicle and the light diffusing support being provided by another set of contacting areas out of register with the first-mentioned set and preferably with substantially no overlap of the contact areas. This means that there is at least one airspace between each point of the image bearing layer and the adjacent point of the light diffusing support. Various methods of obtaining this structure of each airspace separately are described in my concurrently filed application mentioned above. The contact areas may be provided by adhesive spots or by relief areas which may be on the pellicle itself, on the image bearing layer, or on the light diffusing base. One preferred embodiment of the invention has an arrangement of relief areas on a thin pellicle, two such pellicles being laminated facing in the same direction and a third pellicle without relief areas is cemented or otherwise attached to the tops of the exposed relief areas. The result is a three-layer laminated sheet with two substantially continuous airspaces, at least one such airspace occurring at every point of the sheets areas. The airspace sheet is then laminated between the picture bearing layer and the light diffusing support. A still more preferred embodiment has a single pellicle with "out-of-register" adhesive spots on both sides thereof which may be laminated directly or with additional interlayers between a transparent layer and a light diffusing layer. Such a sheet is also useful in anti-halation layers.

The invention, and the principle thereof, will be fully understood from the following description when read in connection with the accompanying drawing, in which:

Figs. 1 and 2 illustrate the theory of the air-spaced support;

Figs. 3 to 6 are enlarged cross sections of various embodiments of the present invention;

Fig. 7 illustrates the making of a universally useable pellicle according to the invention and the lamination of this pellicle between an image bearing layer and its support.

In Fig. 1 an image bearing layer 10 is separated by an airspace 11 from a light diffusing support such as paper or film containing a translucent pigment. For simplification this support is represented by a transparent layer 12 and a translucent layer 13, the diffusion being assumed to take place at the interface 14. Of course, the layer 12 may be infinitesimal in thickness or the light diffusion may be distributed throughout the support.

Light represented by a ray 15 strikes the diffusing surface 14 at the point 17 and is diffused. Part of this light as represented by the ray 18 passes back through the color layer 10. Light diffused at high obliquity such as indicated by the rays 19 may be totally and internally reflected within the layer 12 and strike the diffusing surface 14 again at the point 21. A ray 20 may also strike this point 21 directly and, of course, is much more intense than the ray 19. However, light from the point 21 is made up of two parts the major portion of which came from the ray 20. Part of this as shown by the ray 22 passes to the eye 23 of an observer who at the moment is examining a portion of the image in a layer 10 adjacent to the point 21. This ray 22 will be mainly colored by the portion of the layer 10 near the point 21 because the extraneous ray 19 is not highly colored since it passed through the layer 10 only once and then practically directly through as indicated by the portion 16.

However, according to the prior art as shown in Fig. 2 an extraneous light striking the point 36 is diffused to send a ray 37 directly back and a highly oblique ray 38 passes, as shown by the portions 39, obliquely and hence, through a thick portion of the color layer 30 before it strikes a second point of diffusion 41. Although this ray 38 forms only a small portion of the light in the ray 42 compared with the primary illuminating ray 40 this extraneous ray 38 may be highly colored and cause highlight stain if the region of the image 30 adjacent to the point 41 happens to be a highlight. Thus, the airspace 11 of Fig. 1 increases the brilliance and decreases the highlight stains of a color print. This is all described by Hanson and Evans in the above-mentioned application.

In Fig. 3 an image bearing layer 50 is attached to a pellicle 51 by adhesive spots 53 so that an airspace 54 covering over 50% of the total area is provided. This pellicle 51 is laminated to a light diffusing support 52 by means of a similar array or set of adhesive spots 55 thus providing another airspace 56. The array or set of spots 53 are out of register with the array or set of spots 55 and preferably do not overlap the spots, at least by any substantial amount. This means that there is at least one airspace under every point in the layer of the image 50.

In Fig. 4 the image bearing layer 60 is separated from the light diffusing support 64 by three transparent pellicles 61, 62, and 63 and two airspaces 65 having contact areas out of register and not overlapping.

Either of these embodiments are useful in anti-halation films in which case the top layer (50 or 60) is an emulsion layer and is light diffusing and the base (52 or 63—64) is the transparent layer.

A similar arrangement is provided in Fig. 5 in which the image bearing layer 70 is separated from and fastened to the light diffusing base 78 by three pellicles 71, 74 and 75 laminated together. The pellicle 71 is provided with relief areas 72 providing airspaces 73 and the pellicle 75 is provided with similar relief areas 76 provided with airspaces 77. The tops of these relief areas in both cases are attached to the intermediate pellicle 74, the relief areas being out of register and not overlapping.

A similar arrangement is shown in Fig. 6 in which the picture layer 80 and light diffusing layer 86 are laminated with an intermediate layer made up of three pellicles 81, 82, and 84. Pellicles 82 and 84 are identical having relief areas 83 and 85 respectively on the top areas thereof. These relief areas are out of register and the three pellicles are attached to each other only by the tops of the two sheets of relief areas.

Such supports are produced, as in Fig. 7 for example, by means of steel engraved rolls 90. A continuous web of transparent stock or pellicle 94 may be treated to have adhesive stops 95 on both sides. This is done by intaglio printing with rolls 90 having wells 93 which pick up adhesive 91, the drums being wiped by brushes 92. The adhesive used in dry mounting tissue is satisfactory, the ultimate lamination being by heat under pressure. The pellicle 94 with spots 95 may then be used for direct lamination of a picture bearing layer and a light diffusing support or a film base to a pellicle later to be coated with sensitive emulsion or thirdly may be used as shown in Fig. 7 between two pellicles 61 and 63 to make the material shown in Fig. 4, pellicle 94 becoming interlayer 62 and adhesive 95 becoming contact areas 66. The two rolls 90 which need not match precisely in diameter, are identically engraved or etched in a circumferential direction with parallel series of lines in relief. To allow for spreading the lines are narrower than the spaces for example, in a 40:60 ratio. The rolls 90 are adjusted so that the lines of one roll register with the space of the other roll, i. e. are out of line with the other roll. A thin pellicle sheet 94 of cellulosic derivative or the like is passed in sheet or web form between the rolls to provide the relief areas, for example, by applying adhesive or cement on both sides of the pellicle 94 simultaneously. The printing areas of any form of printing roll may be similarly inked with a colorless transparent adhesive composition.

One embodiment of the invention employs a thermoplastic cement and the resulting pellicle is used in exactly the same manner as dry mounting sheets. The pellicle is sandwiched between a color transparency or a color sensitive emulsion and a white reflecting support such as paper. The contact areas can be almost identical in width producing a 50% airspace above and a 50% airspace below the middle layer which results in a 100% airspace backing while retaining 50% of cemented areas for support on both sides of the middle layer.

I prefer to use lines and a line screen with say 50 lines per inch giving a pattern which can be made exactly out of register on the two sides without much trouble and the resulting cementing includes therefore 100 abutting strips per inch, which are for practical purposes invisible to the naked eye.

In each of the figures the front interface of the low index or air layer is smooth, substantially parallel to the front surface of the picture layer and non-diffusing. If this interface were diffusing as it probably is in the Bencke arrangement referred to above, the primary halation would be extended and also there would no longer be complete elimination of the secondary halation as by the present invention.

Having thus described the preferred embodiments of my invention, I wish to point out that it is not limited to these structures but is of the scope of the appended claims.

I claim:

1. A photographic color print comprising a layer containing a multicolor picture, a light diffusing support for the picture layer and between the support and the picture layer a transparent pellicle and two airspaces one on each side of the pellicle with one set of occasional contact areas between the pellicle and the picture layer and another set of such areas out of register with the first set and between the pellicle and the support, the picture layer and the light diffusing support being separated by less than .005 inch and each of the airspaces having a non-diffusing front interface and a thickness greater than .00005 inch.

2. A photographic color print according to claim 1 in which there is substantially no overlapping of the contact areas of the two sets.

3. A thin supporting layer for photographic records comprising three transparent smooth surfaced pellicles attached to each other only at distributed areas of contact, the areas between one pair of pellicles being out of register with the areas between the other pair, with substantially no overlapping of the contact areas, each of the two intervening airspaces having a thickness greater than .00005 inch and the total thickness of said layer being less than .005 inch, and a light diffusing layer attached to the outside of one of the outer pellicles.

4. A thin supporting layer for a photographic record comprising a light diffusing layer, a transparent smooth surfaced pellicle attached to the layer only at distributed areas of contact and a second transparent smooth surfaced pellicle attached to the first only at distributed areas of contact out of register with and not overlapping the first mentioned areas, each of the two intervening airspaces having a thickness greater than .00005 inch and the total thickness of said layer being less than .005 inch.

5. A thin supporting layer for a photographic record comprising a light diffusing layer, a transparent smooth surfaced pellicle adhered to the layer only by elements of adhesive covering less than ½ of the total area and a second transparent smooth surfaced pellicle adhering to the first only by elements of adhesive out of register with and not overlapping the first mentioned elements, each of the two intervening airspaces having a thickness greater than .00005 inch and the total thickness of said airspaces and pellicles being less than .005 inch.

6. A thin supporting layer for a photographic record comprising a light diffusing layer the top surface of which has elemental areas in relief covering less than ½ of the total area, two transparent smooth surfaced pellicles, one adhering only to the top of said elemental areas and one having similar elemental areas out of register with and not overlapping the first mentioned elemental areas, the two pellicles being in contact also only at the top of the elemental areas, each of the two intervening airspaces having a thickness greater than .00005 inch and the total thickness of said airspaces and pellicles being less than .005 inch.

7. A thin supporting layer for a photographic record comprising three smooth surfaced pellicle layers two of which have elemental areas in relief covering less than ½ of the total area and the three being laminated with contacts only at the top of the elemental areas with airspaces therebetween, the two sets of elemental areas being out of register and not substantially overlapping, each of the two intervening airspaces having a thickness greater than .00005 inch and the total thickness of said layer being less than .005 inch, and a light diffusing layer attached to the outside of one of the outer pellicles.

8. A photographic sheet material comprising a smooth surfaced transparent layer, a light diffusing layer, and an intermediate smooth surfaced pellicle layer in optical contact with each of the other layers only at distributed areas covering less than half the total area, the set of contacts between the pellicle and the transparent layer being out of register with, and substantially not overlapping the set between the pellicle and the light diffusing layer, the transparent layer and the light diffusing layer being separated by less than .005 inch and each of the intervening airspaces having a thickness greater than .00005 inch.

9. A material according to claim 8 in which the transparent layer contains a multicolored picture and the light diffusing layer is a support for the picture.

10. A material according to claim 8 in which the light diffusing layer contains a sensitive emulsion and the transparent layer is a support for the emulsion.

ALEXANDER MURRAY.